US011225857B2

(12) United States Patent
Bittner et al.

(10) Patent No.: US 11,225,857 B2
(45) Date of Patent: Jan. 18, 2022

(54) SOLUBILITY ENHANCERS ON BASIS OF ALLYL ALCOHOL FOR AQUEOUS SURFACTANT FORMULATIONS FOR ENHANCED OIL RECOVERY

(71) Applicant: BASF SE, Ludwigshafen am Rhein (DE)

(72) Inventors: Christian Bittner, Ludwigshafen am Rhein (DE); Guenter Oetter, Ludwigshafen am Rhein (DE); Jack F. Tinsley, Houston, TX (US); Hans-Christian Raths, Düsseldorf-Holthausen (DE); Marcel Patrik Kienle, Limburgerhof (DE); Sebastian Alexander Weisse, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 73 days.

(21) Appl. No.: 16/627,473

(22) PCT Filed: Jul. 11, 2018

(86) PCT No.: PCT/EP2018/068745
§ 371 (c)(1),
(2) Date: Dec. 30, 2019

(87) PCT Pub. No.: WO2019/011965
PCT Pub. Date: Jan. 17, 2019

(65) Prior Publication Data
US 2021/0148203 A1   May 20, 2021

(30) Foreign Application Priority Data
Jul. 14, 2017   (EP) ..................................... 17181458

(51) Int. Cl.
*E21B 43/16*   (2006.01)
*C09K 8/584*   (2006.01)

(52) U.S. Cl.
CPC .............. *E21B 43/16* (2013.01); *C09K 8/584* (2013.01)

(58) Field of Classification Search
None
See application file for complete search history.

(56) References Cited

U.S. PATENT DOCUMENTS

| 4,448,697 | A | * | 5/1984 | McCoy | .................. | C09K 8/584 |
| | | | | | | 166/270.1 |
| 4,542,790 | A | | 9/1985 | Balzer | | |
| 5,741,947 | A | | 4/1998 | Wolf et al. | | |
| 6,133,217 | A | * | 10/2000 | Lewis | ...................... | C11D 1/83 |
| | | | | | | 510/351 |
| 7,700,702 | B2 | | 4/2010 | Gaillard et al. | | |
| 9,777,094 | B2 | | 10/2017 | Bittner et al. | | |
| 10,266,751 | B2 | | 4/2019 | Bittner et al. | | |
| 2011/0083847 | A1 | | 4/2011 | Bittner et al. | | |
| 2019/0031946 | A1 | | 1/2019 | Rechenbach-Klinke et al. | | |

FOREIGN PATENT DOCUMENTS

| CA | 2760734 A1 | 11/2010 |
| CA | 2774318 A1 | 4/2011 |
| CA | 2790159 A1 | 9/2011 |
| DE | 4325237 A1 | 2/1995 |
| DE | 10243361 A1 | 4/2004 |
| EP | 2432807 A2 | 3/2012 |
| WO | WO-2010133527 A2 | 11/2010 |
| WO | WO-2011045254 A1 | 4/2011 |
| WO | WO-2011110502 A1 | 9/2011 |
| WO | WO-2012158645 A1 | 11/2012 |
| WO | WO-2013090614 A1 | 6/2013 |
| WO | WO-2014095621 A1 | 6/2014 |
| WO | WO-2015048131 A1 | 4/2015 |

(Continued)

OTHER PUBLICATIONS

U.S. Appl. No. 16/617,575, filed Nov. 27, 2019.
U.S. Appl. No. 16/627,489, filed Dec. 30, 2019.
International Search Report for PCT/EP2018/068745 dated Aug. 28, 2018.
International Search Report for PCT/EP2018/068746 dated Aug. 9, 2018.
Written Opinion of the International Searching Authority for PCT/EP2018/068745 dated Aug. 28, 2018.
Written Opinion of the International Searching Authority for PCT/EP2018/068746 dated Aug. 9, 2018.

*Primary Examiner* — Charles R Nold
(74) *Attorney, Agent, or Firm* — Faegre Drinker Biddle & Reath LLP

(57) ABSTRACT

The present invention relates to a method for the production of crude oil from subterranean, oil-bearing formations comprising at least the following steps of providing an aqueous surfactant composition comprising water and a surfactant mixture, injecting said surfactant composition into the subterranean, oil-bearing formation through at least one injection well, thereby reducing the crude oil-water interfacial tension to less than 0.1 mN/m, and withdrawing crude oil from the formation through at least one production well, wherein the surfactant mixture comprises at least a surfactant (A) having the general formula $R^1$—O—$(CH_2CH(R^2)O)_a$—$(CH_2CH(CH_3)O)_b$—$(CH_2CH_2O)_c$—$R^3$—$Y^-M^+$ (I) and a solubility enhancer (B) having the general formula $R^4$—O—$(CH_2CH(CH_3)O)_x$—$(CH_2CH_2O)_y$—$R^3$—$Y^-M^+$ (II), wherein $R^1$ to $R^4$, a, b, c, x, y, Y and M have the meaning as defined the the description and claims. The invention further relates to said aqueous surfactant composition and methods for preparing the same as well as the use of solubility enhancer (B) for enhancing the solubility of anionic surfactant (A).

18 Claims, No Drawings

(56) References Cited

FOREIGN PATENT DOCUMENTS

| WO | WO-2015048139 A1 | 4/2015 |
| WO | WO-2015048142 A1 | 4/2015 |
| WO | WO-2016079121 A1 | 5/2016 |

* cited by examiner

SOLUBILITY ENHANCERS ON BASIS OF ALLYL ALCOHOL FOR AQUEOUS SURFACTANT FORMULATIONS FOR ENHANCED OIL RECOVERY

CROSS-REFERENCE TO RELATED APPLICATIONS

This application is a national stage application (under 35 U.S.C. § 371) of PCT/EP2018/068745, filed Jul. 11, 2018, which claims benefit of European Application No. 17181458.5, filed Jul. 14, 2017, both of which are incorporated herein by reference in their entirety.

The present invention relates to a method for the production of crude oil from subterranean, oil-bearing formations comprising at least the following steps of providing an aqueous surfactant composition comprising water and a surfactant mixture, injecting said surfactant composition into the subterranean, oil-bearing formation through at least one injection well, thereby reducing the crude oil-water interfacial tension to less than 0.1 mN/m, and withdrawing crude oil from the formation through at least one production well.

The invention further relates to said aqueous surfactant composition and methods for preparing the same as well as the use of solubility enhancer (B) for enhancing the solubility of anionic surfactant (A).

In natural mineral oil deposits, mineral oil is present in the cavities of porous reservoir rocks sealed toward the surface of the earth by impervious overlying strata. The cavities may be very fine cavities, capillaries, pores or the like. Fine pore necks may have, for example, a diameter of only about 1 µm. As well as mineral oil, including fractions of natural gas, a deposit generally also comprises water of greater or lesser salt content.

If a mineral oil deposit has a sufficient autogenous pressure, after drilling of the deposit has commenced, mineral oil flows through the well to the surface of its own accord because of the autogenous pressure (primary mineral oil production). Even if a sufficient autogenous pressure is present at first, however, the autogenous pressure of the deposit generally declines relatively rapidly in the course of withdrawal of mineral oil, and so usually only small amounts of the amount of mineral oil present in deposit can be produced in this manner, according to the deposit type.

Therefore, when primary production declines, a known method is to drill further wells, so called injection wells, into the mineral oil-bearing formation in addition to the wells which serve for production of the mineral oil, called the production wells. Through such injection wells, water is injected into the deposit in order to maintain the pressure or increase it again. The injection of the water forces the mineral oil through the cavities in the formation, proceeding gradually from the injection well in the direction of the production well. This technique is known as water flooding and is one of the techniques of what is called secondary oil production. However, this only works for as long as the cavities are completely filled with oil and the more viscous oil is pushed onward by the water. As soon as the mobile water breaks through cavities, it flows on the path of least resistance from this time, i.e. through the channel formed, and no longer pushes the oil onward. With ongoing water flooding more and more oil is trapped in the capillaries as isolated spherical droplets while the water flows through the channels formed without effect. Consequently, the amount of oil produced form the production well more and more decreases while the amount of water more and more increases.

If economically viable oil production is impossible or no longer possible by means of primary or secondary mineral oil production techniques for tertiary mineral oil production, also known as "Enhanced Oil Recovery (EOR)", may be applied to enhance the oil production. Tertiary mineral oil production includes processes in which suitable chemicals, such as surfactants and/or polymers, are used as auxiliaries for oil production. A review of tertiary oil production using chemicals can be found, for example, in the article by D. G. Kessel, *Journal of Petroleum Science and Engineering*, 2 (1989) 81-101.

The techniques of tertiary mineral oil production include what is called "surfactant flooding". In surfactant flooding, aqueous formulations comprising suitable surfactants are injected through the injection wells into the subterranean oil-bearing formation. The surfactants reduce the oil-water interfacial tension thereby mobilizing additional oil from the formation.

The technical requirements for surfactants for enhanced oil recovery are high. Subterranean oil-bearing formations can have different temperatures, for example temperatures from 30° C. to 120° C. and comprise—besides crude oil—also saline formation water. The salinity of formation water may be up to 350000 ppm and formation water may also comprise bivalent cations such as $Mg^{2+}$ and $Ca^{2+}$. It is widely distributed, to use formation water or sea water for making the aqueous surfactant formulation for enhanced oil recovery. Consequently, suitable surfactants for enhanced oil recovery must have a good solubility in formation water at reservoir temperature and should reduce the interfacial tension between crude oil and formation water to less than 0.1 mN/m.

Surfactants frequently either have a good solubility in formation water at formation temperature or yield a low interfacial tension but often surfactants do not meet both requirements simultane-ously. In order to fulfill both requirements, it is an option to use mixtures of two or more different surfactants, for instance a more hydrophilic and a more hydrophobic surfactant. However, when using mixtures of surfactants an additional problem arises, namely that the properties of the mixture not only depend on the nature of the surfactants used but also on mixing ratio of the surfactants.

While the mixing ratio can be properly adjusted without problem when preparing the aqueous surfactant formulation for enhanced oil recovery, it may happen that the mixing ratio does not remain constant after injection into the formation but the mixing ratio changes. Such an effect may be caused by the following mechanism: When flowing through the subterranean formation, the two surfactants may become chromatographically separated if one of the two surfactants adsorbs better on the surface of the formation than the other one. Such a separation may in particular happen if the surfactants are chemically very different or if they don't form mixed mi-celles with each other. So, for a mixture of surfactants, the surfactants should either not become chromatographically separated or the properties of a mixture should not change or should at least not change too much upon variation in the mixing ratio. Finding surfactants mixtures fulfilling all requirements mentioned is time-consuming and complex.

U.S. Pat. No. 4,448,697 discloses a process for recovering hydrocarbons from a subterranean, hydrocar-bon-bearing formation in which a mixture of an anionic sulfate or sulfonate surfactant in mixture with a non-ionic surfactant RO—$(C_4H_8O)_{1-40}(C_2H_4O)_{>10}$H is used. R is selected from $C_1$ to $C_6$ alkyl, phenyl or tolyl.

U.S. Pat. No. 4,542,790 discloses a process of extracting oil from a subterranean deposit by injecting a surfactant mixture comprising an anionic surfactant of the general formula $$R—(OCH_2CH_2)_n—OCH_2COOM \text{ and}$$
$$R—(OCH_2CH_2)_nH,$$

wherein n is from 1 to 30 and R is selected from linear or branched aliphatic groups of 4 to 20 carbon atoms, or alkylphenyl or dialkylphenyl groups of 1 to 14 carbon atoms in the alkyl groups.

WO 2012/158645 A1 discloses a surfactant mixture suitable for enhanced oil recovery comprising a propoxylated $C_{12}$ to $C_{20}$ sulfate, a $C_{12}$ to $C_{20}$ internal olefin sulfonate, and an ethoxylated $C_4$ to $C_{12}$ alcohol sulfate.

WO 2013/090614 A1 discloses a non-surfactant aqueous composition comprising a light co-solvent, a water-soluble polymer and an alkali agent. The light co-solvent may have the formula $$H—(CH_2)_{1-6}(OCH_2CHR)_nOH,$$

wherein n is from 0 to 30 and R is H, methyl or ethyl. The mixture may be used for oil production.

WO 2015/048139 A1 discloses a hydrocarbon recovery composition comprising two different anionic surfactants selected from propoxylated primary alcohol carboxylates or propoxylated primary alcohol glycerol sulfonates, wherein the average carbon number is from 12 to 30 carbon atoms, the branching degree from 0.5 to 3.5 and the number of propylene oxide groups from 1 to 20.

WO 2015/048142 A1 discloses a hydrocarbon recovery composition comprising two different anionic surfactants selected from propoxylated primary alcohol carboxylates or propoxylated primary alcohol glycerol sulfonates and from alkoxylated primary alcohol carboxylates or alkoxylated primary alcohol glycerol sulfonates.

WO 2011/045254 A1 discloses that allyl alcohol may be generated by rearrangement of propylene oxide in the presence of KOH and that such allyl alcohol may then be alkoxylated and sulfated. However, said publication also mentions that such products are not active as surfactants.

It was an object of the present invention to provide an aqueous surfactant composition for EOR methods fulfilling the requirements mentioned above in an optimized manner, especially with regard to surfactant properties, solubility and the like.

The object is achieved by a method for the production of crude oil from subterranean, oil-bearing formations, preferably by Winsor Type III microemulsion flooding, comprising at least the following steps:
(1) providing an aqueous surfactant composition comprising water and a surfactant mixture,
(2) injecting said surfactant composition into the subterranean, oil-bearing formation through at least one injection well, thereby reducing the crude oil-water interfacial tension to less than 0.1 mN/m, and
(3) withdrawing crude oil from the formation through at least one production well,
wherein the surfactant mixture comprises at least
a surfactant (A) having the general formula $$R^1—O—(CH_2CH(R^2)O)_a—(CH_2CH(CH_3)O)_b—(CH_2CH_2O)_c—R^3—Y^-M^+ \quad (I)$$

and
a solubility enhancer (B) having the general formula $$R^4—O—(CH_2CH(CH_3)O)_x—(CH_2CH_2O)_y—R^3—Y^-M^+ \quad (II),$$

wherein
$R^1$ is a hydrocarbon moiety having 8 to 36 carbon atoms,
$R^2$ is a hydrocarbon moiety having 2 to 16 carbon atoms,
$R^3$ is selected from the group of
  a single bond,
  an alkylene group —$(CH_2)_o$—, wherein o is from 1 to 3,
  a group —$CH_2$—$CH(OH)$—$CH_2$—,
$R^4$ is an allyl group $H_2C$=$CH$—$CH_2$—,
$Y^-$ is an anionic group selected from —COO— or —$SO_3^-$,
$M^+$ is at least a cation selected from the group of $H^+$, alkali metal ions, $NH_4^+$, and organic ammonium ions,
a is a number from 0 to 69,
b is a number from 3 to 70,
c is a number from 0 to 50,
x is a number from 1 to 69,
y is a number from 0 to 50,
and wherein
  $R^3$, $Y^-$, and $M^+$ in (A) and (B) are identical,
  x<b,
  y=c, and
  the molar proportion of surfactant (A)/solubility enhancer (B) is from 98:2 to 60:40.

The object is also achieved by an aqueous surfactant composition as defined herein as well as by the use of a solubility enhancer (B) of general formula $$R^4—O—(CH_2CH(CH_3)O)_x—(CH_2CH_2O)_y—R^3—Y^-M^+ \quad (II)$$

as defined herein for enhancing solubility of an anionic surfactant (A) of general formula (I)

$$R^1—O—(CH_2CH(R^2)O)_a—(CH_2CH(CH_3)O)_b—(CH_2CH_2O)_c—R^3—Y^-M^+$$

as defined herein.

Surprisingly it has been found that solubility enhancer (B) can act as surfactant and improves the solubility of surfactant (A) without significantly reducing the interfacial tension reducing properties of surfactant (A), especially under stringent properties, like increased temperature and salt content.

With regard to the invention, the following can be stated specifically:

For the method for the production of crude oil from subterranean formations according to the present invention an aqueous surfactant composition of the present invention comprising at least water, and a surfactant mixture comprising at least surfactant (A) and a solubility enhancer (B), is used.

Both surfactants (A) and (B) represent alkoxylated anionic surfactants, where each surfactant (A) and (B) is represented in the surfactant mixture with a certain distribution regarding the degree of each alkoxylation step. Accordingly, the surfactants (A)/(B) can be considered as mixtures of different surfactants for each type, (A) and (B). In case surfactants and mentioned in singular the main component of chemical compounds with the highest molar proportion is ad-dressed. Accordingly, a plurality of surfactants of the general formula (I) or (II), the numbers a, b, c and x, y are each mean values over all molecules of the surfactants, since the alkoxylation of alcohol with ethylene oxide or propylene oxide or higher alkylene oxides (e.g. butylene oxide to hexadecene oxide) in each case affords a certain distribution of chain lengths. This distribution can be described in a manner known in principle by what is called the polydispersity D. D=MW/Mn is the ratio of the weight-average molar mass and the number-average molar mass. The polydispersity can be determined by methods known to those skilled in the art, for example by means of gel permeation chromatography.

The surfactants (A) have the general formula

$$R^1-O-(CH_2CH(R^2)O)_a-(CH_2CH(CH_3)O)_b-(CH_2CH_2O)_c-R^3-Y^-M^+ \quad (I).$$

The surfactants of formula (I) comprise a hydrocarbon moiety $R^1$, a alkylenoxy groups $-(CH_2CH(R^2)O)-$, b propylenoxy groups $-(CH_2CH(CH_3)O)-$ and c ethylenoxy groups $-(CH_2CH_2O)-$ which are preferably blockwise arranged in the order as indicated in formula (I). For the skilled artisan it is self evident that—due to the conditions of manufacture—the transition between the blocks must not necessarily be abrupt but may also be gradual so that some mixing between the blocks may be observed. Furthermore, a and c may be 0, so one or both of the blocks may not be present in certain embodiments of the invention. The surfactants furthermore comprise an anionic head group $-Y^-M^+$ which is linked by a linking group $R^3$ to the ethylenoxy or the propoxy block.

$R^1$ is a hydrocarbon moiety having 8 to 36, preferably 12 to 32, more preferably 12 to 30, more preferably from 14 to 28 carbon atoms. The hydrocarbon moiety may be linear or branched, unsaturated or saturated, aliphatic and/or aromatic. Of course, the surfactants (A) may comprise two or more different hydrocarbon moieties $R^1$. Preferably $R^1$ is aliphatic, more preferably saturated (alkyl) and more preferably linear.

In one embodiment, $R^1$ is an aromatic hydrocarbon moiety or an aromatic hydrocarbon moiety substituted with aliphatic groups. Examples of substituted aromatic moieties include alkyl-substituted phenyl groups such as a dodecylphenyl group.

In a further embodiment, $R^1$ is a linear or branched, saturated or unsaturated aliphatic hydrocarbon moiety having 8 to 36, preferably 12 to 32, more preferably from 14 to 28 carbon atoms.

In a one embodiment $R^1$ is a linear, saturated or unsaturated, preferably a linear, saturated aliphatic hydrocarbon moiety having 12 to 20 carbon atoms, preferably 14 to 18 carbon atoms, and more preferably 16 to 18 carbon atoms. Preferably, the number of carbon atoms is even.

Such hydrocarbon moieties may be derived from fatty alcohols. Examples of such moieties comprise n-dodecyl, n-tetradecyl, n-hexadecyl, n-octadecyl, and n-eicosyl moieties. Preferably, the surfactants (A) may comprise at least two different linear, aliphatic saturated hydrocarbon moieties $R^1$ whose carbon number differs by two. Examples of such combinations comprise n-dodecyl and n-tetradecyl, n-tetradecyl and n-hexadecyl, n-hexadecyl and n-octadecyl and n-octadecyl and n-eicosyl. Preferably, the surfactants (A) may comprise n-hexadecyl and n-octadecyl moieties.

In another embodiment, $R^1$ is a branched, saturated aliphatic hydrocarbon moiety having the general formula $-CH_2-CH(R^5)(R^6)$ (X), wherein $R^5$ and $R^6$ are independently from each other linear alkyl groups having 4 to 16 carbon atoms with the proviso that the total number of carbon atoms in such moieties (X) is an even number from 12 to 32, preferably from 16 to 28 carbon atoms. Such hydrocarbon moieties are derived from Guerbet alcohols. Preferably, two or more of such hydrocarbon moieties derived from Guerbet alcohols may be present.

In one embodiment, the surfactants (A) comprise hydrocarbon moieties $R^1$ selected from the group of 2-hexyldecyl, 2-octyldecyl, 2-hexyldodecyl, or 2-octyldodecyl or a mixture thereof.

In one embodiment, the surfactants (A) comprise hydrocarbon moieties $R^1$ selected from the group of 2-decyltetradecyl, 2-dodecyltetradecyl, 2-decylhexadecyl, or 2-dodecyltetradecyl or a mixture thereof.

In formula (I) $R^2$ is a hydrocarbon moiety having 2 to 16 carbon atoms, e.g. the group $-(CH_2CH(R^2)O)-$ is derived from butylene oxide or higher alkylene oxides. The hydrocarbon moieties may in particular be selected from linear or branched, unsaturated or saturated, aliphatic hydrocarbon moieties having 2 to 16 carbon atoms, preferably saturated, more preferably saturated and linear hydrocarbon moieties having 2 to 16 carbon atoms. Most preferred are ethyl moieties. The hydrocarbon moieties may furthermore be selected from aromatic hydrocar-bon moieties or hydrocarbon moieties substituted with aliphatic groups, wherein the total number of carbon atoms is from 6 to 10. However preferably, $R^2$ represents an alkyl group as indicated above.

In formulas (I) and (II) $R^3$ is selected from the group consisting of a single bond, an alkylene group $-(CH_2)_o-$, wherein o is from 1 to 3, and a group $-CH_2-CH(OH)-CH_2-$.

In a first aspect of the present invention $Y^-$ is $C(O)O-$ and $R^3$ is $-(CH_2)_o-$ resulting in a carboxylate, wherein o is 1, 2 or 3, preferably 1.

In another aspect of the present invention $Y^-$ is an $SO_3$ group and $R^3$ is $-(CH_2)_o-$ or $-CH_2CH(OH)CH_2-$ resulting in a sulfonate group, wherein o is 2 or 3.

In another aspect of the present invention $Y^-$ is an $SO_3$ group and $R^3$ is a single bond resulting in a sulfate group.

$M^+$ is at least a cation selected from the group of alkali metal ions, $NH_4^+$, and organic ammonium ions. Preferably $M^+$is $Li^+$, $Na^+$, $K^+$, $Rb^+$, $Cs^+$, $NH_4^+$, $N(CH_2CH_2OH)_3H^+$, $N(CH_2CH[CH_3]OH)_3H^+$, $N(CH_3)(CH_2CH_2OH)_2H^+$, $N(CH_3)_2(CH_2CH_2OH)H^+$, $N(CH_3)_3(CH_2CH_2OH)+$, $N(CH_3)_3H^+$, or $N(C_2H_5)_3H^+$. More preferably, $M^+$is $Li^+$, $Na^+$, $K^+$, $Rb^+$, $Cs^+$, or $NH_4^+$. Even more preferably, $M^+$is $Na^+$ or $K^+$. Even more preferably $M^+$is $Na^+$.

The variable "a" represents the number of higher alkoxylates, like butyleneoxy. In a preferred embodiment, a is 0.

The variable "b" represents the number of propylenoxy groups in formula (I). In a preferred embodiment b is a number from 5 to 60. More preferably, b is from 5 to 50, more preferably b is from 5 to 40, more preferably from 5 to 30, even more preferably from 6 to 20 and even more preferably b is from 6 to 10, even more preferably b=7.

The variable "c" represents the number of ethylenoxy groups in formula (I). Preferably, c is a number from 1 to 50, more preferably from 2 to 40, more preferably from 3 to 30, more preferably from 5 to 20, even more preferably c=10.

Preferably the sum of a, b and c, preferably b and c (a=0) is from 5 to 75. More preferably the sum is from 5 to 70, even more preferably from 6 to 60, even more preferably from 7 to 50, even more preferably from 8 to 40, even more preferably from 10 to 30 and even more preferably from 15 to 20.

The solubility enhancer (B) is represented by formula (II)

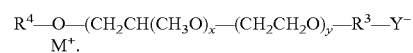

$$R^4-O-(CH_2CH(CH_3)O)_x-(CH_2CH_2O)_y-R^3-Y^-M^+.$$

In formula (II) $R^4$ represents an allyl group.

The variable "x" represents the number of propylenoxy groups in formula (II). Preferably x is a number from 1 to 44, more preferably from 1 to 40, more preferably from 1 to 30, more preferably from 1 to 20, even more preferably from 1 to 10, even more preferably from 1 to 5, even more preferably x=1.6.

The variable "y" represents the number of ethylenoxy groups in formula (II). Preferably, y is a number from 1 to 50, more preferably from 2 to 40, more preferably from 3 to 30, more preferably from 5 to 20, even more preferably y=10.

For formula (I) and (II) the following provisos are given:

$R^3$, $Y^-$, and $M^+$ in (A) and (B) are identical: Accordingly for $R^3$, $Y^-$, and $M^+$ the same applies to formula (II) which is described herein for $R^3$, $Y^-$, and $M^+$ in formula (I).

x<b. Accordingly the degree of propoxylation in enhancer (B) is lower than for surfactant (A).

y=c: Accordingly, the degree of ethoxylation is the same for (A) and (B).

The molar proportion of surfactant (A)/solubility enhancer (B) is from 98:2 to 60:40, preferably from 95:5 to 65:35, more preferably from 95:5 to 70:30, more preferably from 90:10 to 80:20, even more preferably 85:15.

The alkoxylates (A) and (B) can be prepared by methods known in the art starting from a suitable alcohol $R^1OH$, $R^4OH$ respectively, which are commercially available or can be synthesized by methods well known for the practitioner in the art. Also the alkoxylation and subsequent functionalisation in order to introduce group $R^3$—$Y^-M^+$ are well known in the art.

The number of alkoxy groups can be adjusted by molar ratio of the respective starting materials. Alkoxylates (A) and (B) can be prepared separately and mixed to yield the desired ratio.

Alternatively by choice of catalyst during alkoxylation alkoxylate by can be obtained during preparation of (A) as side product due to side reaction of propylene oxide to allyl alcohol. This has the advantage that the surfactant mixture of the present invention with the surfactant mixture can be obtained in a single reaction step ("one pot reaction"). However the one pot reaction is limited with regard to the choice of catalyst. Since NaOH and KOH effect allyl alcohol formation at higher temperatures with the ratio (A) to (B) as given in the present composition, this cannot be achieved by using double metal cyanide (DMC) catalysts, double hydroxide clays or CsOH catalyst. As the allyl alcohol formation is started during propoxylation of the alcohol $R^1OH$, the degree of propoxylation is always lower for (B) compared to (A) (x<b). However, this effect will not affect the ethoxylation in a one pro reaction (y=c) and subsequent derivatisation ($R^3$, $Y^-$, $M^+$ in (A) and (B) are identical). The degree of allyl alcohol formation can be influenced by the amount of catalyst, the temperature and the amount of propylene oxide used for PO formation. Degree of allyl alcohol formation increases with increasing amount of catalyst, with increasing temperature and/or with the increasing amount of propylene oxide used for PO formation. In case of a=0, of low amount of catalyst (less than 0.05 eq KOH with respect to amount of 1.0 eq $R^1$—OH), of moderate temperature (130° C. and less) and of low to moderate amount of propylene oxide (less than 8 eq of propylene oxide) used for PO formation, ratio (A) to (B) is 99.5:0.5 and higher.

Accordingly another aspect of the present invention is a method of manufacturing a surfactant composition of the present invention comprising at least the following steps (a) optionally alkoxylating an alcohol $R^1OH$ with alkylene oxides of the general formula

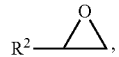 (III)

thereby obtaining $R^1$—O—$(CH_2CH(R^2)O)_a$H (VI), (b) alkoxylating an alcohol $R^1OH$ or the alkoxylated alcohol $R^1$—O—$(CH_2CH(R^2)O)_a$H (VI) with propylene oxide, thereby obtaining a mixture of $R^1$—O—$(CH_2CH(R^2)O)_a$—$(CH_2CH(CH_3)O)_b$H   (V), and $R^4$—O—$(CH_2CH(CH_3)O)_x$H   (VI), (c) optionally alkoxylating the mixture of (V) and (VI) with ethylene oxide, thereby obtaining a mixture of $R^1$—O—$(CH_2CH(R^2)O)_a$—$(CH_2CH(CH_3)O)_b$— $(CH_2CH_2O)_c$H   (VII), and $R^4$—O—$(CH_2CH(CH_3)O)_x$—$(CH_2CH_2O)_y$H   (VIII), (d) introducing terminal anionic groups —$Y^-M^+$ into the mixture of (VII) and (VIII) thereby obtaining a mixture of a surfactant (A) having the general formula $R^1$—O—$(CH_2CH(R^2)O)_a$—$(CH_2CH(CH_3)O)_b$— $(CH_2CH_2O)_c$—$R^3$—$Y^-M^+$   (I)

and a solubility enhancer (B) having the general formula $R^4$—O—$(CH_2CH(CH_3)O)_x$—$(CH_2CH_2O)_y$—$R^3$—$Y^-$ $M^+$   (II), wherein $R^1$, $R^2$, $R^3$, $R^4$, $Y^-$, M+, a, b, c, x, and y have the meaning as defined above.

Optionally step b) is carried out in the presence of NaOH or KOH as catalyst.

Preferably, the mixture of (VII) and (VIII) is reacted with sulfur trioxide or chloro sulfonic acid and then neutralized with a base (e.g. alkali hydroxide such as NaOH). Alternatively, the mixture of (VII) and (VIII) is reacted with sulfamic acid ($SO_3NH_3$).

In another preferred embodiment, the mixture of (VII) and (VIII) is reacted with an ω-halogenated carboxylic acid $R^5$—$(CH_2)_o$—COOH or a salt thereof, wherein $R^5$ is selected from F, Cl, Br, or I and o is from 1 to 3, preferably 1, thereby obtaining a mixture of a surfactant (A) having the general formula $R^1$—O—$(CH_2CH(R^2)O)_a$—$(CH_2CH(CH_3)O)_b$— $(CH_2CH_2O)_c$—$(CH_2)_o$—$COO^-M^+$   (Ia)

and a solubility enhancer (B) having the general formula $R^4$—O—$(CH_2CH(CH_3)O)_x$—$(CH_2CH_2O)_y$— $(CH_2)_o$—$COO^-M^+$   (IIa).

In order to increase the amount of (B) separately prepared (B) can be added to the surfactant mixture after the one pot reaction.

The aqueous surfactant composition comprises water, and a surfactant mixture with at least (A) and (B). The composition may in addition comprise salts. Typically, saline water is used in the aqueous surfactant composition. The saline water may, inter alia, be river water, seawater, water from an aquifer close to the deposit, so-called injection water, deposit water, so-called production water which is being reinjected again, or mixtures of the above-described waters. However, the saline water may also be that which has been obtained from a more saline water: for example, partial desalination, depletion of the polyvalent cations or by dilution with fresh water or drinking water. The surfactant mixture can preferably be provided as a concentrate which, as a result of the preparation, may also comprise salt.

A further aspect is the use of a solubility enhancer (B) of general formula

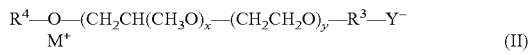
$$R^4-O-(CH_2CH(CH_3)O)_x-(CH_2CH_2O)_y-R^3-Y^-M^+ \quad (II)$$

as defined herein for enhancing solubility of an anionic surfactant (A) of general formula (I)

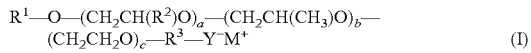
$$R^1-O-(CH_2CH(R^2)O)_a-(CH_2CH(CH_3)O)_b-(CH_2CH_2O)_c-R^3-Y^-M^+ \quad (I)$$

as defined herein. Preferably, (A) and (B) are used in a ratio as described herein, more preferably (A) and (B) are used in an aqueous composition of the present invention.

In a preferred embodiment, the method for the production of crude oil according to the present invention is a method for Winsor Type III microemulsion flooding, which is known in the art.

The Winsor type III microemulsion is in equilibrium with excess water and excess oil. Under these conditions of microemulsion formation, the surfactants cover the oil-water interface and lower the interfacial tension 6 more preferably to values of <$10^{-2}$ mN/m (ultra-low interfacial tension). In order to achieve an optimal result, the proportion of the microemulsion in the water-microemulsion-oil system, for a defined amount of surfactant, should naturally be at a maximum, since this allows lower interfacial tensions to be achieved.

In this manner, it is possible to alter the form of the oil droplets (the interfacial tension between oil and water is lowered to such a degree that the smallest interface state is no longer favored and the spherical form is no longer preferred), and they can be forced through the capillary openings by the flooding water.

When all oil-water interfaces are covered with surfactant, in the presence of an excess amount of surfactant, the Winsor type III microemulsion forms. It thus constitutes a reservoir for surfactants which cause a very low interfacial tension between oil phase and water phase. By virtue of the Winsor type III microemulsion having a low viscosity, it also migrates through the porous deposit rock in the flooding process. Emulsions, in contrast, may remain suspended in the porous matrix and block deposits. If the Winsor type III microemulsion meets an oil-water interface as yet uncovered with surfactant, the surfactant from the microemulsion can significantly lower the interfacial tension of this new interface and lead to mobilization of the oil (for example by deformation of the oil droplets).

The oil droplets can subsequently combine to give a continuous oil bank. This has two advantages:

Firstly, as the continuous oil bank advances through new porous rock, the oil droplets present there can coalesce with the bank.

Moreover, the combination of the oil droplets to give an oil bank significantly reduces the oil-water interface and hence surfactant no longer required is released again. Thereafter, the surfactant released, as described above, can mobilize oil droplets remaining in the formation.

Winsor type III microemulsion flooding is consequently an exceptionally efficient process, and requires much less surfactant compared to an emulsion flooding process. In microemulsion flooding, the surfactants are typically optionally injected together with cosolvents and/or basic salts (optionally in the presence of chelating agents). Subsequently, a solution of thickening polymer is injected for mobility control. A further variant is the injection of a mixture of thickening polymer and surfactants, cosolvents and/or basic salts (optionally with chelating agent), and then a solution of thickening polymer for mobility control. These solutions should generally be clear in order to prevent blockages of the reservoir.

In the context of the process according to the invention for crude oil production, the use of the inventive surfactant composition lowers the interfacial tension between oil and water to values of <0.1 mN/m, preferably to <0.05 mN/m, more preferably to <0.01 mN/m. Thus, the interfacial tension between oil and water is lowered to values in the range from 0.1 mN/m to 0.0001 mN/m, preferably to values in the range from 0.05 mN/m to 0.0001 mN/m, more preferably to values in the range from 0.01 mN/m to 0.0001 mN/m. The stated values relate to the prevailing deposit temperature. A particularly preferred embodiment is a Winsor type III microemulsion flooding operation as outlined above.

In a further preferred embodiment of the invention, a thickening polymer from the group of the biopolymers or from the group of the copolymers based on acrylamide is added to the aqueous surfactant composition. The copolymer may consist, for example, of the following units inter alia:

acrylamide and acrylic acid sodium salt
acrylamide and acrylic acid sodium salt and N-vinylpyrrolidone
acrylamide and acrylic acid sodium salt and AMPS (2-acrylamido-2-methylpropanesulfonic acid sodium salt)
acrylamide and acrylic acid sodium salt and AMPS (2-acrylamido-2-methylpropanesulfonic acid sodium salt) and N-vinylpyrrolidone.

The copolymer may also additionally comprise associative groups. Preferred copolymers are described in EP 2432807 or in WO 2014095621. Further preferred copolymers are described in U.S. Pat. No. 7,700,702.

In a preferred embodiment of the invention, it is a characteristic feature of the process that the production of crude oil from underground mineral oil deposits is a surfactant flooding method or a surfactant/polymer flooding method and not an alkali/surfactant/polymer flooding method and not a flooding method in which $Na_2CO_3$ is injected as well.

In a particularly preferred embodiment of the invention, it is a characteristic feature of the process that the production of crude oil from underground mineral oil deposits is a Winsor type III microemulsion flooding method or a Winsor type III microemulsion/polymer flooding method and not an alkali/Winsor type III microemulsion/polymer flooding method and not a flooding method in which $Na_2CO_3$ is injected as well.

The subterranean, oil-bearing formation(s) are typically deposit rocks, which may be sandstone or carbonate.

In a preferred embodiment of the invention, the deposit is a sandstone deposit, wherein more than 70 percent by weight of sand (quartz and/or feldspar) is present and up to 25 percent by weight of other minerals selected from kaolinite, smectite, illite, chlorite and/or pyrite may be present. It is preferable that more than 75 percent by weight of sand (quartz and/or feldspar) is present and up to 20 percent by weight of other minerals selected from kaolinite, smectite, illite, chlorite and/or pyrite may be present. It is especially preferable that more than 80 percent by weight of sand (quartz and/or feldspar) is present and up to 15 percent by weight of other minerals selected from kaolinite, smectite, illite, chlorite and/or pyrite may be present.

The API gravity (American Petroleum Institute gravity) is a conventional unit of density commonly used in the USA for crude oils. It is used globally for characterization and as a quality standard for crude oil. The API gravity is calculated from the relative density $p_{rel}$ of the crude oil at 60° F. (15.56° C.), based on water, using $$\text{API gravity} = (141.5/p_{rel}) - 131.5.$$

According to the invention, the crude oil from the deposit should have at least 10° API. Preference is given to at least 12° API. Particular preference is given to at least 15° API. Very particular preference is given to at least 20° API.

The deposit temperature in the mineral oil deposit in which the method of the invention is employed is, in accordance with the invention, 15 to 150° C., especially 20° C. to 140° C., preferably 25° C. to 130° C., more preferably 30° C. to 120° C. and, for example, 35° C. to 110° C.

The salts in the deposit water may especially be alkali metal salts and alkaline earth metal salts.

Examples of typical cations include $Na^+$, $K^+$, $Mg^{2+}$ and/or $Ca^{2+}$, and examples of typical anions include chloride, bromide, hydrogencarbonate, sulfate or borate. The amount of alkaline earth metal ions may preferably be 0 to 53 000 ppm, more preferably 1 ppm to 20 000 ppm and even more preferably 10 to 6000 ppm.

In general, at least one or more than one alkali metal ion is present, especially at least $Na^+$. In addition, alkaline earth metal ions can also be present, in which case the weight ratio of alkali metal ions/alkaline earth metal ions is generally ≥2, preferably ≥3. Anions present are generally at least one or more than one halide ion(s), especially at least $Cl^-$. In general, the amount of $Cl^-$ is at least 50% by weight, preferably at least 60% by weight, based on the sum total of all the anions.

The total amount of all the salts in the deposit water may be up to 350 000 ppm (parts by weight), based on the sum total of all the components in the formulation, for example 2000 ppm to 350 000 ppm, especially 5000 ppm to 250 000 ppm. If seawater is used for injection, the salt content may be 2000 ppm to 40 000 ppm, and, if formation water is used, the salt content may be 5000 ppm to 250 000 ppm, for example 10 000 ppm to 200 000 ppm.

The aqueous surfactant composition comprises (A) and (B) and may comprise further surfactants. The concentration of all the surfactants together is 0.05% to 0.49% by weight, based on the total amount of the aqueous composition injected. The total surfactant concentration is preferably 0.06% to 0.39% by weight, more preferably 0.08% to 0.29% by weight. It is preferred that no further surfactants, other than (A) and (B), are present.

In a further preferred embodiment of the invention, at least one organic cosolvent can be added to the surfactant mixture claimed. These are preferably completely water-miscible solvents, but it is also possible to use solvents having only partial water miscibility. In general, the solubility should be at least 50 g/l, preferably at least 100 g/l. Examples include aliphatic C3 to C8 alcohols, preferably C4 to C6 alcohols, further preferably C3 to C6 alcohols, which may be substituted by 1 to 5, preferably 1 to 3, ethylenoxy units to achieve sufficient water solubility. Further examples include aliphatic diols having 2 to 8 carbon atoms, which may optionally also have further substitution. For example, the cosolvent may be at least one selected from the group of 2-butanol, 2-methyl-1-propanol, butyl ethylene glycol, butyl diethylene glycol or butyl triethylene glycol.

Accordingly, it is preferable that the aqueous surfactant composition comprises, as well as the anionic surfactant (A) of the general formula (I) and the enhancer (B) of the general formula (II), also a cosolvent selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms.

Particular preference is given to a aqueous surfactant composition of the present invention in the form of a concentrate comprising 20% by weight to 70% by weight of the surfactant mixture, 10% by weight to 40% by weight of water and 10% by weight to 40% by weight of a cosolvent, based on the total amount of the concentrate, where the cosolvent is selected from the group of the aliphatic alcohols having 3 to 8 carbon atoms or from the group of the alkyl monoethylene glycols, the alkyl diethylene glycols or the alkyl triethylene glycols, where the alkyl radical is an aliphatic hydrocarbyl radical having 3 to 6 carbon atoms, and the concentrate is free-flowing at 20° C. and has a viscosity at 40° C. of <1500 mPas at 200 Hz.

It is most preferable that the concentrate comprises butyl diethylene glycol as cosolvent.

A further embodiment of the invention is a composition of the present invention further comprising surfactants (C) which are not identical to the surfactants (A) or (B), and
- are from the group of the alkylbenzenesulfonates, alpha-olefinsulfonates, internal olefinsulfonates, paraffin-sulfonates, where the surfactants have 14 to 28 carbon atoms; and/or
- are selected from the group of the alkyl ethoxylates and alkyl polyglucosides, where the particular alkyl radical has 8 to 18 carbon atoms.

For the surfactants (C), particular preference is given to alkyl polyglucosides which have been formed from primary linear fatty alcohols having 8 to 14 carbon atoms and have a glucosidation level of 1 to 2, and alkyl ethoxylates which have been formed from primary alcohols having 10 to 18 carbon atoms and have an ethoxylation level of 3 to 25.

The surfactants (A) and (B) according to the general formula (I) or (II) can preferably be prepared by base-catalyzed alkoxylation. In this case, the alcohol $R^1OH$ can be admixed in a pressure reactor with alkali metal hydroxides (e.g. NaOH, KOH, CsOH), preferably potassium hydroxide, or with alkali metal alkoxides, for example sodium methoxide or potassium methoxide. Water (or MeOH) still present in the mixture can be drawn off by means of reduced pressure (for example <100 mbar) and/or increasing the temperature (30 to 150° C.). Thereafter, the alcohol is present in the form of the corresponding alkoxide. This is followed by inertization with inert gas (for example nitrogen) and stepwise addition of the alkylene oxide(s) at temperatures of 60 to 180° C. up to a pressure of not more than 20 bar (preferably not more than 10 bar). In a preferred embodiment, the alkylene oxide is metered in initially at 120° C. In the course of the reaction, the heat of reaction released causes the temperature to rise up to 170° C.

In a further preferred embodiment of the invention, the higher alkylene oxide (e.g. butylene oxide or hexadecene oxide) is first added at a temperature in the range from 100 to 145° C., then the propylene oxide is added at a temperature in the range from 100 to 145° C., and subsequently the ethylene oxide is added at a temperature in the range from 120 to 165° C. At the end of the reaction, the catalyst can, for example, be neutralized by adding acid (for example acetic acid or phosphoric acid) and be filtered off if required. However, the material may also remain unneutralized.

The alkoxylation of the alcohols $R^1OH$ can also be undertaken by means of other methods, for example by acid-catalyzed alkoxylation. In addition, it is possible to use, for example, double hydroxide clays, as described in DE 4325237 A1, or it is possible to use double metal cyanide catalysts (DMC catalysts). Suitable DMC catalysts are disclosed, for example, in DE 10243361 A1, especially in paragraphs [0029] to [0041] and the literature cited therein. For example, it is possible to use catalysts of the Zn—Co type. To perform the reaction, the alcohol $R^1OH$ can be admixed with the catalyst, and the mixture dewatered as described above and reacted with the alkylene oxides as described. Typically not more than 1000 ppm of catalyst based on the mixture are used, and the catalyst can remain in the product owing to this small amount. The amount of catalyst may generally be less than 1000 ppm, for example 250 ppm or less.

Further derivatization can be carried out by methods well known in the art. For example in order to prepare carboxylates the nonionic alkoxylation intermediate can be reacted, while stirring, with chloroacetic acid or chloroacetic acid sodium salt in the presence of alkali metal hydroxide or aqueous alkali metal hydroxide, with removal of water of reaction such that the water content in the reactor is kept at a value of 0.2% to 1.7% (preferably 0.3% to 1.5%) during the carboxymethylation by applying reduced pressure and/or by passing nitrogen through.

Additionally preferably, the methods of the invention for crude oil production comprise the method steps of the production methods of the invention that are upstream of the injection step.

The above-described method of crude oil production with the aid of the aqueous surfactant composition (A) of the general formula (I) and (B) of the general formula (II) can optionally be conducted with the addition of further methods. For instance, it is optionally possible to add a polymer or a foam for mobility control. The polymer can optionally be injected into the deposit together with the surfactant formulation, followed by the surfactant formulation. It can also be injected only with the surfactant formulation or only after surfactant formulation. The polymers may be copolymers based on acrylamide or a biopolymer. The copolymer may consist, for example, of the following units inter alia:
   acrylamide and acrylic acid sodium salt
   acrylamide and acrylic acid sodium salt and N-vinylpyrrolidone
   acrylamide and acrylic acid sodium salt and AMPS (2-acrylamido-2-methylpropanesulfonic acid sodium salt)
   acrylamide and acrylic acid sodium salt and AMPS (2-acrylamido-2-methylpropanesulfonic acid sodium salt) and N-vinylpyrrolidone.

The copolymer may also additionally comprise associative groups. Usable copolymers are described in EP 2432807 or in WO 2014095621. Further usable copolymers are described in U.S. Pat. No. 7,700,702.

The polymers can be stabilized by addition of further additives such as biocides, stabilizers, free radical scavengers and inhibitors.

The foam can be produced at the deposit surface or in situ in the deposit by injection of gases such as nitrogen or gaseous hydrocarbons such as methane, ethane or propane. The foam can be produced and stabilized by adding the surfactant mixture claimed or else further surfactants.

Optionally, it is also possible to add a base such as alkali metal hydroxide or alkali metal carbonate to the surfactant formulation, in which case it is combined with complexing agents or polyacrylates in order to prevent precipitation as a result of the presence of polyvalent cations. In addition, it is also possible to add a cosolvent to the formulation.

This gives rise to the following (combined) methods:
surfactant flooding
Winsor type III microemulsion flooding
surfactant/polymer flooding
Winsor type III microemulsion/polymer flooding
alkali/surfactant/polymer flooding
alkali/Winsor type III microemulsion/polymer flooding
surfactant/foam flooding
Winsor type III microemulsion/foam flooding
alkali/surfactant/foam flooding
alkali/Winsor type III microemulsion/foam flooding In a preferred embodiment of the invention, one of the first four methods is employed (surfactant flooding, Winsor type III microemulsion flooding, surfactant/polymer flooding or Winsor type III microemulsion/polymer flooding). Particular preference is given to Winsor type III microemulsion/polymer flooding.

In Winsor type III microemulsion/polymer flooding, in the first step, a surfactant formulation is injected with or without polymer. The surfactant formulation, on contact with crude oil, results in the formation of a Winsor type III microemulsion. In the second step, only polymer is injected. In the first step in each case, it is possible to use aqueous formulations having higher salinity than in the second step. Alternatively, both steps can also be conducted with water of equal salinity.

In one embodiment, the methods can of course also be combined with water flooding. In the case of water flooding, water is injected into a mineral oil deposit through at least one injection well, and crude oil is withdrawn from the deposit through at least one production well. The water may be freshwater or saline water such as seawater or deposit water. After the water flooding, the method of the invention may be employed.

To execute the method of the invention, at least one production well and at least one injection well are sunk into the mineral oil deposit. In general, a deposit is provided with several injection wells and with several production wells. An aqueous formulation of the water-soluble components described is injected through the at least one injection well into the mineral oil deposit, and crude oil is withdrawn from the deposit through at least one production well. As a result of the pressure generated by the aqueous formulation injected, called the "flood", the mineral oil flows in the direction of the production well and is produced via the production well.

The term "crude oil" or "mineral oil" in this context of course does not just mean single-phase oil; instead, the term also encompasses the usual crude oil-water emulsions. It will be clear to the person skilled in the art that a mineral oil deposit may also have a certain temperature distribution. Said deposit temperature is based on the region of the deposit between the injection and production wells which is covered by the flooding with aqueous solutions. Methods of determining the temperature distribution of a mineral oil deposit are known in principle to those skilled in the art. The temperature distribution is generally determined from temperature measurements at particular sites in the formation in combination with simulation calculations; the simulation calculations also take account of the amounts of heat introduced into the formation and the amounts of heat removed from the formation.

The method of the invention can especially be employed in mineral oil deposits having an average porosity of 5 mD to 4 D, preferably 50 mD to 2 D and more preferably 200 mD to 1 D. The permeability of a mineral oil formation is reported by the person skilled in the art in the unit "darcy" (abbreviated to "D" or "mD" for "millidarcies"), and can be determined from the flow rate of a liquid phase in the mineral oil formation as a function of the pressure differential applied. The flow rate can be determined in core flooding tests with drill cores taken from the formation. Details of this can be found, for example, in K. Weggen, G. Pusch, H. Rischmüller in "*Oil and Gas*", pages 37 ff., *Ullmann's Encyclopedia of Industrial Chemistry*, Online Edition, Wiley-VCH, Weinheim 2010. It will be clear to the person skilled in the art that the permeability in a mineral oil deposit need not be homogeneous, but generally has a certain distribution, and the permeability reported for a mineral oil deposit is accordingly an average permeability.

Additives can be used, for example, in order to prevent unwanted side effects, for example the unwanted precipitation of salts, or in order to stabilize the polymer used. composition injected into the formation in the flooding process flow only very gradually in the direction of the production well, meaning that they remain under formation conditions in the formation for a prolonged period. Degradation of polymers results in a decrease in the viscosity. This either has to be taken into account through the use of a higher amount of polymer, or else it has to be accepted that the efficiency of the method will worsen. In each case, the economic viability of the method worsens. A multitude of mechanisms may be responsible for the degradation of the polymer. By means of suitable additives, the polymer degradation can be prevented or at least delayed according to the conditions.

In one embodiment of the invention, the aqueous composition used additionally comprises at least one oxygen scavenger. Oxygen scavengers react with oxygen which may possibly be present in the aqueous formulation and thus prevent the oxygen from being able to attack the polymer or polyether groups. Examples of oxygen scavengers comprise sulfites, for example $Na_2SO_3$, bisulfites, phosphites, hypophosphites or dithionites.

In a further embodiment of the invention, the aqueous composition used comprises at least one free radical scavenger. Free radical scavengers can be used to counteract the degradation of the polymer by free radicals. Compounds of this kind can form stable compounds with free radicals. Free radical scavengers are known in principle to those skilled in the art. For example, they may be stabilizers selected from the group of sulfur compounds, secondary amines, sterically hindered amines, N-oxides, nitroso compounds, aromatic hydroxyl compounds or ketones. Examples of sulfur compounds include thiourea, substituted thioureas such as N,N'-dimethylthiourea, N,N'-diethylthiourea, N,N'-diphenylthiourea, thiocyanates, for example ammonium thiocyanate or potassium thiocyanate, tetramethylthiuram disulfide, and mercaptans such as 2-mercaptobenzothiazole or 2-mercaptobenzimidazole or salts thereof, for example the sodium salts, sodium dimethyldithiocarbamate, 2,2'-dithiobis(benzothiazole), 4,4'-thiobis(6-t-butyl-m-cresol). Further examples include phenoxazine, salts of carboxylated phenoxazine, carboxylated phenoxazine, methylene blue, dicyandiamide, guanidine, cyanamide, paramethoxyphenol, sodium salt of paramethoxyphenol, 2-methylhydroquinone, salts of 2-methylhydroquinone, 2,6-di-t-butyl-4-methylphenol, butylhydroxyanisole, 8-hydroxyquinoline, 2,5-di(t-amyl)-hydroquinone, 5-hydroxy-1,4-naphthoquinone, 2,5-di(t-amyl)hydroquinone, dimedone, propyl 3,4,5-trihydroxybenzoate, ammonium N-nitrosophenylhydroxylamine, 4-hydroxy-2,2,6,6-tetramethyloxypiperidine, N-(1,3-dimethylbutyl)-N'-phenyl-p-phenylenediamine and 1,2,2,6,6-pentamethyl-4-piperidinol. Preference is given to sterically hindered amines such as 1,2,2,6,6-pentamethyl-4-piperidinol and sulfur compounds, mercapto compounds, especially 2-mercaptobenzothiazole or 2-mercaptobenzimidazole or salts thereof, for example the sodium salts, and particular preference is given to 2-mercaptobenzothiazole or salts thereof.

In a further embodiment of the invention, the aqueous formulation used comprises at least one sacrificial reagent. Sacrificial reagents can react with free radicals and thus render them harmless. Examples include especially alcohols. Alcohols can be oxidized by free radicals, for example to ketones. Examples include monoalcohols and polyalcohols, for example 1-propanol, 2-propanol, propylene glycol, glycerol, butanediol or pentaerythritol.

In a further embodiment of the invention, the aqueous composition used additionally comprises at least one complexing agent. It is of course possible to use mixtures of various complexing agents. Complexing agents are generally anionic compounds which can complex especially divalent and higher-valency metal ions, for example $Mg^{2+}$ or $Ca^{2+}$. In this way, it is possible, for example, to prevent any unwanted precipitation. In addition, it is possible to prevent any polyvalent metal ions present from crosslinking the polymer by means of acidic groups present, especially COOH group. The complexing agents may especially be carboxylic acid or phosphonic acid derivatives. Examples of complexing agents include ethylenediaminetetraacetic acid (EDTA), ethylenediaminesuccinic acid (EDDS), diethylenetriaminepentamethylenephosphonic acid (DTPMP), methylglycinediacetic acid (MGDA) and nitrilotriacetic acid (NTA). Of course, the corresponding salts of each may also be involved, for example the corresponding sodium salts. In a particularly preferred embodiment of the invention, MGDA is used as complexing agent As an alternative to or in addition to the abovementioned chelating agents, it is also possible to use polyacrylates.

In a further embodiment of the invention, the composition further comprises at least one organic cosolvent as outlined above. These are preferably completely water-miscible solvents, but it is also possible to use solvents having only partial water miscibility. In general, the solubility should be at least 50 g/l, preferably at least 100 g/l. Examples include aliphatic $C_4$ to $C_8$ alcohols, preferably $C_4$ to $C_6$ alcohols, which may be substituted by 1 to 5, preferably 1 to 3, ethylenoxy units to achieve sufficient water solubility. Further examples include aliphatic diols having 2 to 8 carbon atoms, which may optionally also have further substitution. For example, the cosolvent may be at least one selected from the group of 2-butanol, 2 methyl-1-propanol, butylglycol, butyldiglycol and butyltriglycol.

The injecting of the aqueous composition can be undertaken by means of customary apparatuses. The composition can be injected into one or more injection wells by means of customary pumps. The injection wells are typically lined with steel tubes cemented in place, and the steel tubes are perforated at the desired point. The formulation enters the mineral oil formation from the injection well through the perforation. The pressure applied by means of the pumps, in a manner known in principle, is used to fix the flow rate of the formulation and hence also the shear stress with which the aqueous formulation enters the formation. The shear stress on entry into the formation can be calculated by the person skilled in the art in a manner known in principle on the basis of the Hagen-Poiseuille law, using the area through which the flow passes on entry into the formation, the mean pore radius and the volume flow rate. The average permeability of the formation can be found as described in a manner known in principle. Naturally, the greater the volume flow rate of aqueous polymer formulation injected into the formation, the greater the shear stress.

The rate of injection can be fixed by the person skilled in the art according to the conditions in the formation. Preferably, the shear rate on entry of the aqueous polymer formulation into the formation is at least 30 000 s$^{-1}$, preferably at least 60 000 s$^{-1}$ and more preferably at least 90 000 s$^{-1}$.

In one embodiment of the invention, the method of the invention is a flooding method in which a base and typically a complexing agent or a polyacrylate is used. This is typically the case when the proportion of polyvalent cations in the deposit water is low (100-400 ppm). An exception is sodium metaborate, which can be used as a base in the presence of significant amounts of polyvalent cations even without complexing agent.

The pH of the aqueous formulation is generally at least 8, preferably at least 9, especially 9 to 13, preferably 10 to 12 and, for example, 10.5 to 11.

In principle, it is possible to use any kind of base with which the desired pH can be attained, and the person skilled in the art will make a suitable selection. Examples of suitable bases include alkali metal hydroxides, for example NaOH or KOH, or alkali metal carbonates, for example $Na_2CO_3$. In addition, the bases may be basic salts, for example alkali metal salts of carboxylic acids, phosphoric acid, or especially complexing agents comprising acidic groups in the base form, such as EDTANa$_4$.

Mineral oil typically also comprises various carboxylic acids, for example naphthenic acids, which are converted to the corresponding salts by the basic formulation. The salts act as naturally occurring surfactants and thus support the process of oil removal.

With complexing agents, it is advantageously possible to prevent unwanted precipitation of sparingly soluble salts, especially Ca and Mg salts, when the alkaline aqueous formulation comes into contact with the corresponding metal ions and/or aqueous formulations for the process comprising corresponding salts are used. The amount of complexing agents is selected by the person skilled in the art. It may, for example, be 0.1% to 4% by weight, based on the sum total of all the components of the aqueous formulation.

In another preferred embodiment of the invention, however, a method of crude oil production is employed in which no base (e.g. alkali metal hydroxides or alkali metal carbonates) is used.

The invention is illustrated in detail by the examples which follow.

SYNTHESIS EXAMPLES

Preparation of the Anionic Surfactants (A) and (B):
Abbreviations Used:
EO ethylenoxy
PO propylenoxy The following alcohols were used for the synthesis:

| Alcohol | Description |
|---|---|
| Allyl | Commercially available allyl alcohol consisting of linear unsaturated primary $C_3H_5$—OH ($H_2C$=$CHCH_2OH$) |
| $C_{16}C_{18}$ | Commercially available tallow alcohol mixture consisting of linear saturated primary $C_{16}H_{33}$—OH and $C_{18}H_{37}$—OH |

1 a) Allyl-1.6PO-10EO-CH$_2$CO$_2$Na corresponding to solubility enhancer (B) of the general formula (II) $R^4$—O—(CH$_2$C(CH$_3$)HO)$_x$—(CH$_2$CH$_2$O)$_y$—$R^3$—Y$^-$M$^+$ with $R^4$=H$_2$C=CHCH$_2$, x=1.6, y=10, $R^3$=CH$_2$, Y=CO$_2$ and M=Na.

A 2 L pressure autoclave with an anchor stirrer was initially charged with 116 g (2.0 mol) of allyl alcohol and the stirrer was switched on. Thereafter, 2.37 g of potassium tert-butoxide (0.021 mol of KOtBu) were added. The vessel was purged three times with N$_2$. Thereafter, the vessel was checked for leaks, the pressure was adjusted to 0.5 bar gauge (1.5 bar absolute) and the vessel was heated to 120° C. At 150 revolutions per minute, 186 g (3.2 mol) of propylene oxide were metered in at 120° C. within 3 h. The mixture was stirred at 130° C. for 3 h. 881 g (20 mol) of ethylene oxide were metered in at 120° C. within 24 h. The mixture was left to react for a further 1 h, cooled down to 80° C. and decompressed to 1.0 bar absolute. Nitrogen was bubbled through the solution for 15 min. Thereafter, it was transferred at 80° C. under N$_2$. The analysis (mass spectrum, GPC, 1H NMR in CDCl$_3$, 1H NMR in MeOD) confirmed the average composition CH$_2$=CH—CH$_2$O-1.6 PO-10 EO-H.

A 250 mL flange reactor with a three-level beam stirrer was charged with 130 g (0.22 mol, 1.0 eq) of CH$_2$=CH—CH$_2$O-1.6 PO-10 EO-H and 35.3 g (0.297 mol, 1.35 eq) of chloroacetic acid sodium salt (98% purity) and the mixture was stirred at 45° C. for 15 min at 400 revolutions per minute under standard pressure. 2.0 g (0.05 mol, 0.227 eq) of NaOH microprills (diameter 0.5-1.5 mm) were introduced, and a vacuum of 100 mbar was applied for 30 min. Thereafter, the following procedure was conducted six times: 1.645 g (0.0411 mol, 0.187 eq) of NaOH microprills (diameter 0.5-1.5 mm) were introduced, a vacuum of 100 mbar was applied for removal of the water of reaction, the mixture was stirred for 50 min, and then the vacuum was broken with N$_2$. A total of 11.88 g (0.297 mol, 1.35 eq) of NaOH microprills were added. During the first hour of this period, the speed of rotation was increased to about 1000 revolutions per minute. Thereafter, the mixture was stirred at 45° C. and at 100 mbar for a further 10 h. The vacuum was broken with N$_2$ and experiment was discharged (yield>95%).

A liquid which is white/yellowish and viscous at 20° C. was obtained. The pH (5% in water) was 8. The molar proportion of chloroacetic acid sodium salt is about 6 mol %. The molar proportion of glycolic acid sodium salt is about 7 mol %. The carboxymethylation level is 80% according to $^1$H NMR ($^1$H NMR with addition of trichloroacetyl isocyanate shift reagent). The surfactant content is 83 percent by weight.

1 b) C16C18-7 PO-10 EO-CH$_2$CO$_2$Na corresponding to anionic surfactant (A) of the general formula (I) $R^1$—O—(CH$_2$C(R$^2$)HO)$_a$—(CH$_2$C(CH$_3$)HO)$_b$—(CH$_2$CH$_2$O)$_c$—R$^3$—Y$^-$M$^+$ with $R^1$=C$_{16}$H$_{33}$/C$_{18}$H$_{37}$, a=0, b=7, c=10, $R^3$=CH$_2$, Y=CO$_2$ and M=Na.

A 2 L pressure autoclave with anchor stirrer was initially charged with 304 g (1.19 mol) of C16C18 alcohol and the stirrer was switched on. Thereafter, 4.13 g of 50% aqueous KOH solution (0.037 mol KOH, 2.07 g KOH) were added, a vacuum of 25 mbar was applied, and the mixture was heated to 100° C. and kept there for 120 min, in order to distill off the water. The vessel was purged three times with $N_2$. Thereafter, the vessel was checked for leaks, the pressure was adjusted to 1.0 bar gauge (2.0 bar absolute), the vessel was heated to 130° C. and then the pressure was adjusted to 2.0 bar absolute. At 150 revolutions per minute, 482 g (8.31 mol) of propylene oxide were metered in at 130° C. within 6 h; $p_{max}$ was 6.0 bar absolute. The mixture was stirred at 130° C. for a further 2 h. 522 g (11.9 mol) of ethylene oxide were metered in at 130° C. within 10 h; $p_{max}$ was 5.0 bar absolute. The mixture was left to react for 1 h until the pressure was constant, cooled to 100° C. and decompressed to 1.0 bar absolute. A vacuum of <10 mbar was applied and residual oxide was drawn off for 2 h. The vacuum was broken with $N_2$ and the product was transferred at 80° C. under $N_2$. The analysis (mass spectrum, GPC, 1H NMR in $CDCl_3$, 1H NMR in MeOD) confirmed the average composition C16C18-7 PO-10 EO-H.

A 250 mL flange reactor with a three-level beam stirrer was charged with 165.3 g (0.150 mol, 1.0 eq) of C16C18-7 PO-10 EO-H containing 0.005 mol of C16C18-7 PO-10 EO-K and 24.1 g (0.203 mol, 1.35 eq) of chloroacetic acid sodium salt (98% purity) and the mixture was stirred at 45° C. at 400 revolutions per minute under standard pressure for 15 min. Thereafter, the following procedure was conducted eight times: 1.02 g (0.0253 mol, 0.1688 eq) of NaOH microprills (diameter 0.5-1.5 mm) were introduced, a vacuum of 30 mbar was applied for removal of the water of reaction, the mixture was stirred for 50 min, and then the vacuum was broken with $N_2$. A total of 8.1 g (0.203 mol, 1.35 eq) of NaOH microprills was added over a period of about 6.5 h. During the first hour of this period, the speed of rotation was increased to about 1000 revolutions per minute. Thereafter, the mixture was stirred at 45° C. and at 30 mbar for a further 3 h. The vacuum was broken with $N_2$ and experiment was discharged (yield>95%).

A liquid which is white/yellowish and viscous at 20° C. was obtained. The pH (5% in water) was 7.5. The water content was 1.5%. The molar proportion of chloroacetic acid sodium salt is about 2 mol %. The content of NaCl is about 6.0% by weight. The OH number of the reaction mixture is 8.0 mg KOH/g. The molar proportion of glycolic acid sodium salt is about 3 mol %. The carboxymethylation level is 85%. 99 g of butyl diethylene glycol and 99 g of water were added. The surfactant content is 45 percent by weight.

Application Tests:
Determination of Solubility

The surfactants were mixed (example 3) and stirred with the respective salt composition in the respective concentration to be examined in saline water at 20-30° C. for 30 min (alternatively, the surfactant was dissolved in water, the pH was adjusted if required to a range from 6.5 to 8 by addition of aqueous hydrochloric acid, and appropriate amounts of the respective salt were dissolved at 20° C.). This was followed by stepwise heating until turbidity or a phase separation set in. This was followed by cautious cooling, and the point at which the solution became clear or slightly scattering again was noted. This was recorded as the cloud point.

At particular fixed temperatures, the appearance of the surfactant solution in saline water was noted. Clear solutions or solutions that are slightly scattering and become somewhat lighter again as a result of light shear (but do not turn creamy with time) are considered to be accepta-ble. Said slightly scattering surfactant solutions are filtered through a filter with pore size 2 μm. No separation at all was observed.

The stated amounts of surfactant were reported as percent by weight of the active substance (corrected for 100% surfactant content).

Determination of Interfacial Tension

Interfacial tensions of crude oil with respect to saline water in the presence of the surfactant solution at temperature were determined by the spinning drop method using an SVT20 from DataPhysics. For this purpose, an oil droplet was injected into a capillary filled with saline surfactant solution at temperature and the expansion of the droplet at about 4500 revolutions per minute was observed and the evolution of the interfacial tension with time was noted. The interfacial tension IFT (or $s_{II}$) was calculated here—as described by Hans-Dieter Dörfler in "Grenzflächen und kolloid-disperse Systeme" [Interfaces and Colloidally Disperse Systems], Springer Verlag Berlin Heidelberg 2002—by the following formula from the cylinder diameter $d_z$, the speed w, and the density differential $$(d_1-d_2): s_{II}=0.25 \leq d_z^3 \cdot w2 \cdot (d_1-d_2).$$

The stated amounts of surfactant were reported as percent by weight of the active substance (corrected for 100% surfactant content).

The API (American Petroleum Institute) gravity is a conventional density unit in common use in the USA for crude oils. It is used globally for characterization of and as a quality yardstick for crude oil. The API gravity is determined from the relative density $p_{rel}$ of the crude oil at 60° F. (15.56° C.) based on water by $$\text{API gravity}=(141.5/p_{rel})-131.5.$$

The experimental results for solubility and for interfacial tension after 0.75 to 7.5 h are shown in table 1.

TABLE 1

Interfacial tensions and solubilities with surfactant mixture of anionic surfactant (A) of the general formula (I) and solubility enhancer (B) of the general formula (II)

| Example | Surfactant formulation | Salt solution | Crude oil [° API] | IFT at temperature | Surfactant solubility in the salt solution at temperature |
|---|---|---|---|---|---|
| C1 | 0.3% by weight of active substance C16C18—7PO—10EO—CH$_2$CO$_2$Na from ex. 1 b) [corresponding to anionic surfactant (A)] | salt content ~138320 ppm with 546 ppm of divalent cations (13.4% NaCl, 0.14% KCl, 0.14% MgCl$_2$ × 6 H$_2$O, 0.14% CaCl$_2$ × 2 H$_2$O, 0.14% Na$_2$SO$_4$) | >30 | 0.075 mN/m at 50° C. | Soluble in a clear solution at 50° C. |

TABLE 1-continued

Interfacial tensions and solubilities with surfactant mixture of anionic surfactant (A) of the general formula (I) and solubility enhancer (B) of the general formula (II)

| Example | Surfactant formulation | Salt solution | Crude oil [° API] | IFT at temperature | Surfactant solubility in the salt solution at temperature |
|---|---|---|---|---|---|
| C2 | 0.3% by weight of active substance C16C18—7PO—10EO—CH$_2$CO$_2$Na from ex. 1 b) [corresponding to anionic surfactant (A)] | salt content ~138320 ppm with 546 ppm of divalent cations (13.4% NaCl, 0.14% KCl, 0.14% MgCl$_2$ × 6 H$_2$O, 0.14% CaCl$_2$ × 2 H$_2$O, 0.14% Na$_2$SO$_4$) | >30 | >3 mN/m at 85° C., since surfactant insoluble | Insoluble at 85° C. |
| 3 | 0.045% by weight of active substance Allyl-1.6 PO—10EO—CH$_2$CO$_2$Na from ex. 1 a) with 0.3% by weight of active substance C16C18—7PO—10EO—CH$_2$CO$_2$Na from ex. 1 b) [corresponding to ratio solubility enhancer (B) to anionic surfactant (A) = 13:87 based on weight or 15:85 on a molar basis] | salt content ~138320 ppm with 546 ppm of divalent cations (13.4% NaCl, 0.14% KCl, 0.14% MgCl$_2$ × 6 H$_2$O, 0.14% CaCl$_2$ × 2 H$_2$O, 0.14% Na$_2$SO$_4$) | >30 | 0.065 mN/m at 85° C. | Soluble in a clear solution at 85° C. |

As can be seen in comparative example C1 in table 1, the anionic surfactant (A) gives desired interfacial tensions of <0.1 mN/m at 50° C. at the given high salinity. However, if the temperature is increased to 85° C. (comparative example C2) at the same salinity, the anionic surfactant (A) becomes insoluble and it is no longer possible to achieve low interfacial tensions. Astonishingly, by a small addition of solubility enhancer (B) to the anionic surfactant (A) at 85° C. and the given high salinity, it is possible to achieve both solubility of the surfactants and the desired interfacial tensions of <0.1 mN/m (inventive example 3). The small addition is reflected in the ratio of solubility enhancer (B) to anionic surfactant (A) of 13:87 based on weight or 15:85 on a molar basis.

The invention claimed is:

1. A method for the production of crude oil from subterranean, oil-bearing formations comprising at least the following steps:
   (1) providing an aqueous surfactant composition comprising water and a surfactant mixture,
   (2) injecting said surfactant composition into the subterranean, oil-bearing formation through at least one injection well, thereby reducing the crude oil-water interfacial tension to less than 0.1 mN/m, and
   (3) withdrawing crude oil from the formation through at least one production well,
   wherein the surfactant mixture comprises at least
   (A) a surfactant (A) having the general formula

and
   (B) a solubility enhancer (B) having the general formula

wherein
   $R^1$ is a hydrocarbon moiety having 8 to 36 carbon atoms,
   $R^2$ is a hydrocarbon moiety having 2 to 16 carbon atoms,
   $R^3$ is selected from the group of
      a single bond,
      an alkylene group —(CH$_2$)$_o$—, wherein o is from 1 to 3,
      a group —CH$_2$—CH(OH)—CH$_2$—,
   $R^4$ is an allyl group H$_2$C=CH—CH$_2$—,
   $Y^-$ is an anionic group selected from —COO$^-$ or —SO$_3^-$,
   $M^+$ is at least a cation selected from the group of alkali metal ions, NH$_4^+$, and organic ammonium ions,
   a is a number from 0 to 69,
   b is a number from 3 to 70,
   c is a number from 0 to 50,
   x is a number from 1 to 69,
   y is a number from 0 to 50,
   and wherein
   $R^3$, $Y^-$, and $M^+$ in (A) and (B) are identical,
   x<b,
   y=c, and
   the molar proportion of surfactant (A)/solubility enhancer (B) is from 98:2 to 60:40.

2. The method according to claim 1, wherein b is a number from 5 to 60.

3. The method according to claim 1, wherein x is a number from 1 to 44.

4. The method according to claim 1, wherein c is a number from 1 to 50, and y is a number from 1 to 50.

5. The method according to claim 1, wherein a is 0.

6. The method according to claim 1, wherein the sum of b and c is from 5 to 75.

7. The method according to claim 1, wherein $R^1$ is a hydrocarbon moiety having 12 to 32 carbon atoms.

8. The method according to claim 1, wherein $Y^-$ is a —COO$^-$ group and $R^3$ is —(CH$_2$)$_o$— wherein o is from 1 to 3.

9. The method according to claim 1, wherein $Y^-$ is an —SO$_3^-$ group and $R^3$ is selected from —(CH$_2$)$_o$— wherein o is 2 or 3 and —CH$_2$—CH(OH)—CH$_2$—.

10. The method according to claim 1, wherein $Y^-$ is an —SO$_3^-$ group and $R^3$ is a single bond or an alkylene group —(CH$_2$)$_o$— wherein o is 1 to 3.

11. The method according to claim 1, wherein the molar proportion of surfactant (A)/solubility enhancer (B) is from 95:5 to 65:35.

12. The method according to claim 1, wherein the aqueous surfactant composition additionally comprises salts.

13. The method according to claim 1, wherein the method is Winsor Type III microemulsion flooding.

14. An aqueous surfactant composition as defined in claim 1.

15. A method of manufacturing a surfactant composition according to claim 14 comprising at least the following steps
(a) optionally alkoxylating an alcohol $R^1OH$ with alkylene oxides of the general formula

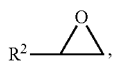 (III)

thereby obtaining $R^1\text{—}O\text{—}(CH_2CH(R^2)O)_a H$ (VI), (b) alkoxylating an alcohol $R^1OH$ or the alkoxylated alcohol $R^1\text{—}O\text{—}(CH_2CH(R^2)O)_a H$ (VI) with propylene oxide, thereby obtaining a mixture of $R^1\text{—}O\text{—}(CH_2CH(R^2)O)_a\text{—}(CH_2CH(CH_3)O)_b H$ (V), and $R^4\text{—}O\text{—}(CH_2CH(CH_3)O)_x H$ (VI), (c) optionally alkoxylating the mixture of (V) and (VI) with ethylene oxide, thereby obtaining a mixture of $R^1\text{—}O\text{—}(CH_2CH(R^2)O)_a\text{—}(CH_2CH(CH_3)O)_b$
$(CH_2CH_2O)_c H$ (VII), and $R^4\text{—}O\text{—}(CH_2CH(CH_3)O)_x\text{—}(CH_2CH_2O)_y H$ (VIII), (d) introducing terminal anionic groups —$Y^-M^+$ into the mixture of (VII) and (VIII) thereby obtaining a mixture of (A) a surfactant (A) having the general formula $R^1\text{—}O\text{—}(CH_2CH(R^2)O)_a\text{—}(CH_2CH(CH_3)O)_b\text{—}$
$(CH_2CH_2O)_c\text{—}R^3\text{—}Y^-M^+$ (I)

and (B) a solubility enhancer (B) having the general formula $R^4\text{—}O\text{—}(CH_2CH(CH_3)O)_x\text{—}(CH_2CH_2O)_y\text{—}R^3\text{—}Y^-$
$M^+$ (II), wherein $R^1$, $R^2$, $R^3$, $R^4$, $Y^-$, $M^+$, a, b, c, x, and y have the meaning as defined in claim 14.

16. The method according to claim 15, wherein the mixture of (VII) and (VIII) is reacted with an ω-halogenated carboxylic acid $R^5\text{—}(CH_2)_o\text{—}COOH$ or a salt thereof, wherein $R^5$ is selected from F, Cl, Br, or I and o is from 1 to 3, thereby obtaining a mixture of (A) a surfactant (A) having the general formula $R^1\text{—}O\text{—}(CH_2CH(R^2)O)_a\text{—}(CH_2CH(CH_3)O)_b\text{—}$
$(CH_2CH_2O)_c\text{—}(CH_2)_o\text{—}COO^-M^+$ (Ia)

and (B) a solubility enhancer (B) having the general formula $R^4\text{—}O\text{—}(CH_2CH(CH_3)O)_x\text{—}(CH_2CH_2O)_y\text{—}(CH_2)_o\text{—}COO^-M^+$ (IIa).

17. A method for enchancing solubility of an anionic surfactant (A) of general formula (I)

$R^1\text{—}O\text{—}(CH_2CH(R^2)O)_a\text{—}(CH_2CH(CH_3)O)_b\text{—}$
$(CH_2CH_2O)_c\text{—}R^3\text{—}Y^-M^+$ (I)

which comprises utilizing a solubility enhancer (B) of general formula (II)

$R^4\text{—}O\text{—}(CH_2CH(CH_3)O)_x\text{—}(CH_2CH_2O)_y\text{—}R^3\text{—}Y^-$
$M^+$ (II), wherein
$R^1$ is a hydrocarbon moiety having 8 to 36 carbon atoms,
$R^2$ is a hydrocarbon moiety having 2 to 16 carbon atoms,
$R^3$ is selected from the group of
  a single bond,
  an alkylene group —$(CH_2)_o$—, wherein o is from 1 to 3,
  a group —$CH_2$—$CH(OH)$—$CH_2$—,
$R^4$ is an allyl group $H_2C\text{=}CH\text{—}CH_2$—,
$Y^-$ is an anionic group selected from —$COO^-$ or —$SO_3^-$,
$M^+$ is at least a cation selected from the group of alkali metal ions, $NH_4^+$, and organic ammonium ions,
a is a number from 0 to 69,
b is a number from 3 to 70,
c is a number from 0 to 50,
x is a number from 1 to 69,
Y is a number from 0 to 50.

18. The method as claimed in claim 17, wherein
$R^3$, $Y^-$, and $M^+$ in (A) and (B) are identical,
x<b,
y=c, and
the molar proportion of surfactant (A)/solubility enhancer (B) is from 98:2 to 60:40.

* * * * *